(12) United States Patent
Yang

(10) Patent No.: US 7,334,965 B2
(45) Date of Patent: Feb. 26, 2008

(54) METHOD FOR TREATING A BODY OF A POLLUTED POROUS MEDIUM

(75) Inventor: Gordon C. C. Yang, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 0 days.

(21) Appl. No.: 11/406,436

(22) Filed: Apr. 19, 2006

(65) Prior Publication Data
US 2006/0237029 A1 Oct. 26, 2006

(30) Foreign Application Priority Data
Apr. 20, 2005 (TW) .............................. 94112553 A

(51) Int. Cl.
*B09C 1/00* (2006.01)
(52) U.S. Cl. .................. 405/128.75; 588/313; 977/903
(58) Field of Classification Search ................ 977/903; 405/128.75; 588/313

See application file for complete search history.

(56) References Cited

OTHER PUBLICATIONS

Yang, Gordon CC; Chemical reduciton of Nitrate by nanosized iron: kinnetics and pathways, Mar. 2005, Water research vol. 39, issue 5.*
http://etd.lib.nsysu.edu.tw/ETD-db/ETD-search/view_etd?URN=etd-0828103-155838"Title page for etd-0828103-155838", 2004.*
Treatment of Nitrate-Containing Soil by Nano-sclae Iron Particles and Electrokinetic Remediation, Hsiao-Lan Lee, 2004.*
http://web.archive.org/web/*/http://etd.lib.nsysu.edu.tw (one page) 2007.*
http://web.archive.org/web/20040816075629/etd.lib.nsysu.edu.tw/ETD-db/ETD-browse/browse?first_letter=L, pp. 1 and 13, printed Apr. 2, 2007.*

* cited by examiner

*Primary Examiner*—John Kreck
(74) *Attorney, Agent, or Firm*—Foley & Lardner LLP

(57) ABSTRACT

A method for treating a body of a polluted porous medium, includes the steps of: preparing a reactive solution containing nanoparticles; injecting the reactive solution into the body of the polluted porous medium so as to decompose pollutants in the polluted porous medium by reacting the nanoparticles with the pollutants; and applying an electric field to the body of the polluted porous medium so as to enhance transporting effect of the nanoparticles in the body of the polluted porous medium.

6 Claims, 3 Drawing Sheets

Preparing a reactive solution containing nanoparticles — 1

Injecting the reactive solution into a polluted porous medium — 2

Applying an electric field to the polluted porous medium — 3

METHOD FOR TREATING A BODY OF A POLLUTED POROUS MEDIUM

CROSS-REFERENCE TO RELATED APPLICATION

This application claims priority of Taiwanese application no. 094112553, filed on Apr. 20, 2005.

BACKGROUND OF THE INVENTION

1. Field of the Invention

This invention relates to a method for treating a body of a polluted porous medium, more particularly to a method for treating a body of a polluted porous medium using nanoparticles.

2. Description of the Related Art

In recent years, nanotechnology has a great impact on the fields of biotechnology, energy source, information, microelectromechanics, and environmental engineering due to the specific properties of nanoscale particles. Specifically, it is found that when the dimensions of a particulate particle are reduced to nano-scale, e.g., 1 to 100 nm, the physicochemical properties thereof, such as specific surface area, optical property, electrical property, magnetic property, configuration, and reactivity, are markedly changed, and reactivity thereof is greatly improved.

For example, nanotechnology has been applied to environmental engineering including pollution prevention, treatment, and remediation. Research has shown that iron nanoparticles having high reactivity and large surface area can be used to remedy polluted subsurface environment, e.g., soil and ground water. Compared with iron particles having larger dimensions, iron nanoparticles reported have a superior effect on the treatment of chlorinated organic solvents, organochlorine pesticides, heavy metals, and radionuclides. In addition, environmental remediation of contaminated sites using the iron nanoparticles has been developed to a scale of in situ field test. For example, a suspension including the iron nanoparticles is injected into ground water under a gravity-fed or pressurized condition, and is transported by the flow of ground water through a polluted porous medium, such as contaminated soil or polluted ground water, so as to degrade the contaminants into non-toxic compounds.

However, the transporting rate of the suspension including the nanoscale iron particles by the flow of the ground water is relatively slow such that the efficiency for environmental remediation is limited.

SUMMARY OF THE INVENTION

Therefore, the object of the present invention is to provide a method for treating a body of a polluted porous medium that can overcome the aforesaid drawback of the prior art.

According to this invention, a method for treating a body of a polluted porous medium comprises the steps of: preparing a reactive solution containing nanoparticles; injecting the reactive solution into the body of the polluted porous medium so as to decompose pollutants in the polluted porous medium by reacting the nanoparticles with the pollutants; and applying an electric field to the body of the polluted porous medium so as to enhance transporting effect of the nanoparticles in the body of the polluted porous medium.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
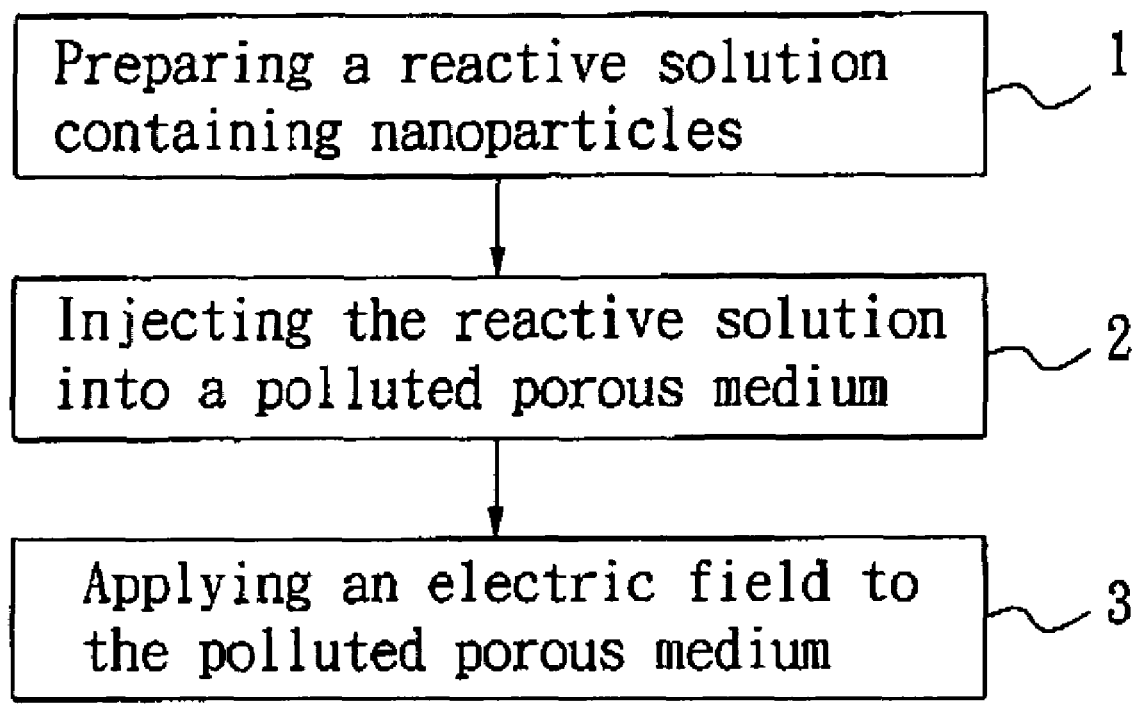
FIG. 1 is a flow chart illustrating consecutive steps of the first preferred embodiment of a method for treating contaminated soil according to this invention.

Referring to FIG. 1, the first preferred embodiment of a method for treating contaminated soil according to this invention includes the steps of: preparing a reactive solution containing nanoparticles; injecting the reactive solution into the body of the contaminated soil so as to decompose pollutants in the contaminated soil by reacting the nanoparticles with the pollutants; and applying an electric field to the contaminated soil so as to enhance transporting effect of the nanoparticles in the contaminated soil.

Preferably, the reactive solution is a solution containing iron nanoparticles, and is prepared by adding a reducing agent into an aqueous solution of an iron salt to reduce the iron salt into iron nanoparticles, followed by adding a dispersing agent into the mixture to permit suspension of the iron nanoparticles in the reactive solution.

The iron salt is a compound selected from the group consisting of: ferric chloride, ferrous chloride, ferric sulfide, ferrous sulfide, ferric nitride, ferrous nitride, ferric bromide, ferrous bromide, and combinations thereof.

The reducing agent is a compound selected from the group consisting of: sodium borohydride, potassium borohydride, lithium borohydride, sodium carbonate, potassium carbonate, sodium hydroxide, potassium hydroxide, lithium hydroxide, methanol, ethanol, lithium aluminum tetrahydride, ammonium ion, hydrazine, citric acid, sodium citrate, potassium citrate, and combinations thereof.

In addition, other nanoparticles suitable for this purpose can be used in this invention based on the porous medium and the pollutant(s) to be treated.

In this invention, the dispersing agent is selected from the group consisting of polyvinylalcohol, polyacrylic acid, polyvinylpyrrolidone, polyethyleneimine, polyethylene oxides, sodium polyphosphate, sodium polyacrylate, terraalkylammonium halogenides, sodium dodecyl sulfate, sodium hexametaphosphate, and combinations thereof. The iron nanoparticles thus formed have a particle size ranging from 1 to 100 nm, and may carry positive or negative electric charge.

Figure 2:
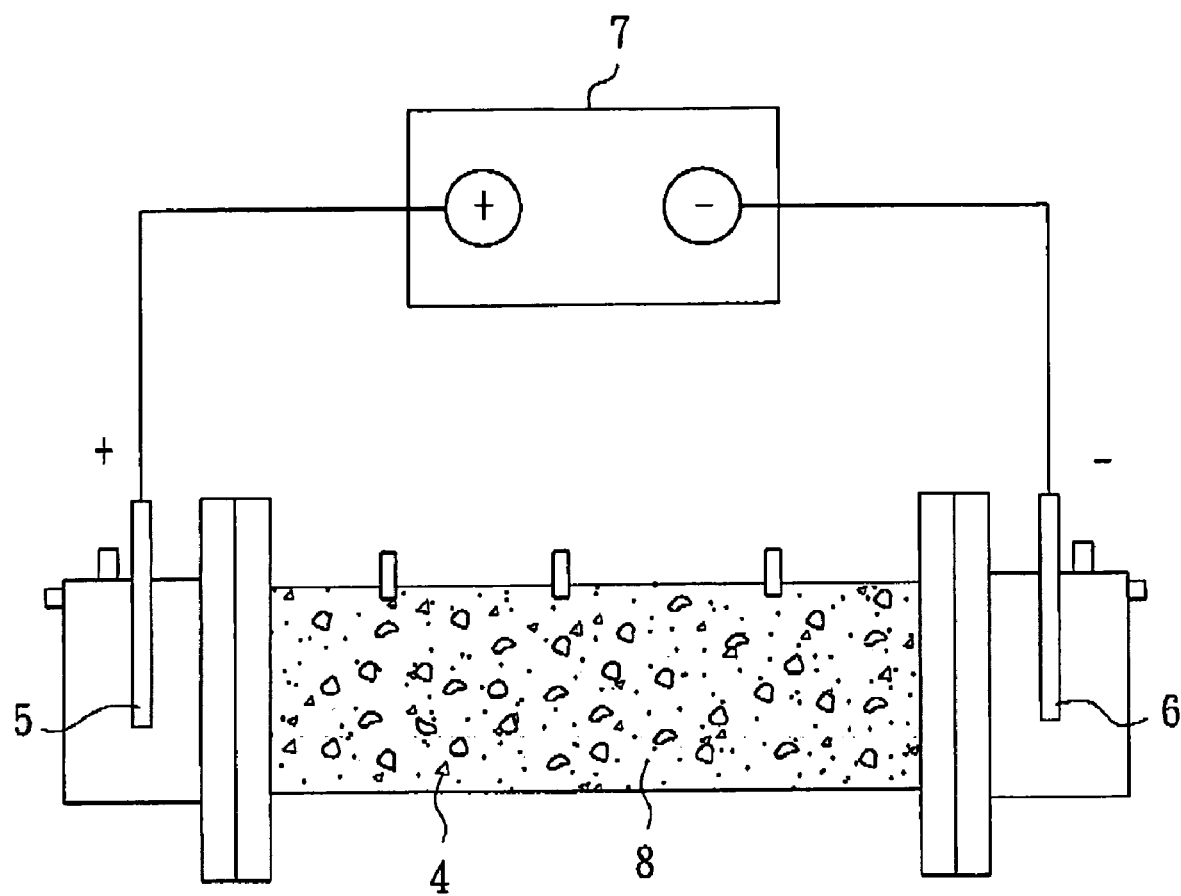
FIG. 2 is a schematic view of an apparatus used in the first preferred embodiment.

Referring to FIG. 2, the contaminated soil 4 to be treated in this embodiment contains contaminants, such as chlorinated organic compounds. A moving path of the injected solution in the contaminated soil 4 is predetermined. The moving path has start and end terminals where an anode 5 and a cathode 6 are installed, respectively, The reactive solution containing iron nanoparticles 8 is injected at the anode 5 in this embodiment. Alternatively, the reactive solution containing iron nanoparticles 8 can be injected at the cathode 6 or the contaminated soil 4. After injecting the reactive solution into the contaminated soil 4, an electric field from a power supply 7 is applied between the anode 5 and cathode 6. The intensity of the electric field is controlled by the amount of applied voltage or current to the anode 5 and cathode 6. The output voltage value of the power supply 7 is controlled within 5 to 50 volts, or the output potential gradient thereof is controlled to range from 0.5 to 2.5 V/cm. Otherwise, the output current value of the power supply 7 is controlled within 0.01 to 10 amperes, or the density of output current is controlled to range from 0.1 to 1.0 mA/cm$^2$.

The externally applied electric field accelerates the transporting rate of the iron nanoparticles 8 in the polluted porous medium 4 through electrokinetic phenomena, i.e., electrophoresis, electroosmosis, etc., such that the reacting opportunity between the iron nanoparticles 8 and the pollutants in the polluted porous medium 4 is increased, thereby resulting in an increase in the treatment efficiency and a decrease in the treatment time.

In this embodiment, the transportation of the nanoparticles 8 is conducted through electroosmosis. The electroosmotic flow rate of the iron nanoparticles ranges from $1.0 \times 10^{-4}$ to $5.0 \times 10^{-3}$ mL/s, and the electroosmosis coefficient is between $8.0 \times 10^{-7}$ and $1.0 \times 10^{-5}$ cm$^2$/V·s.

Figure 3:
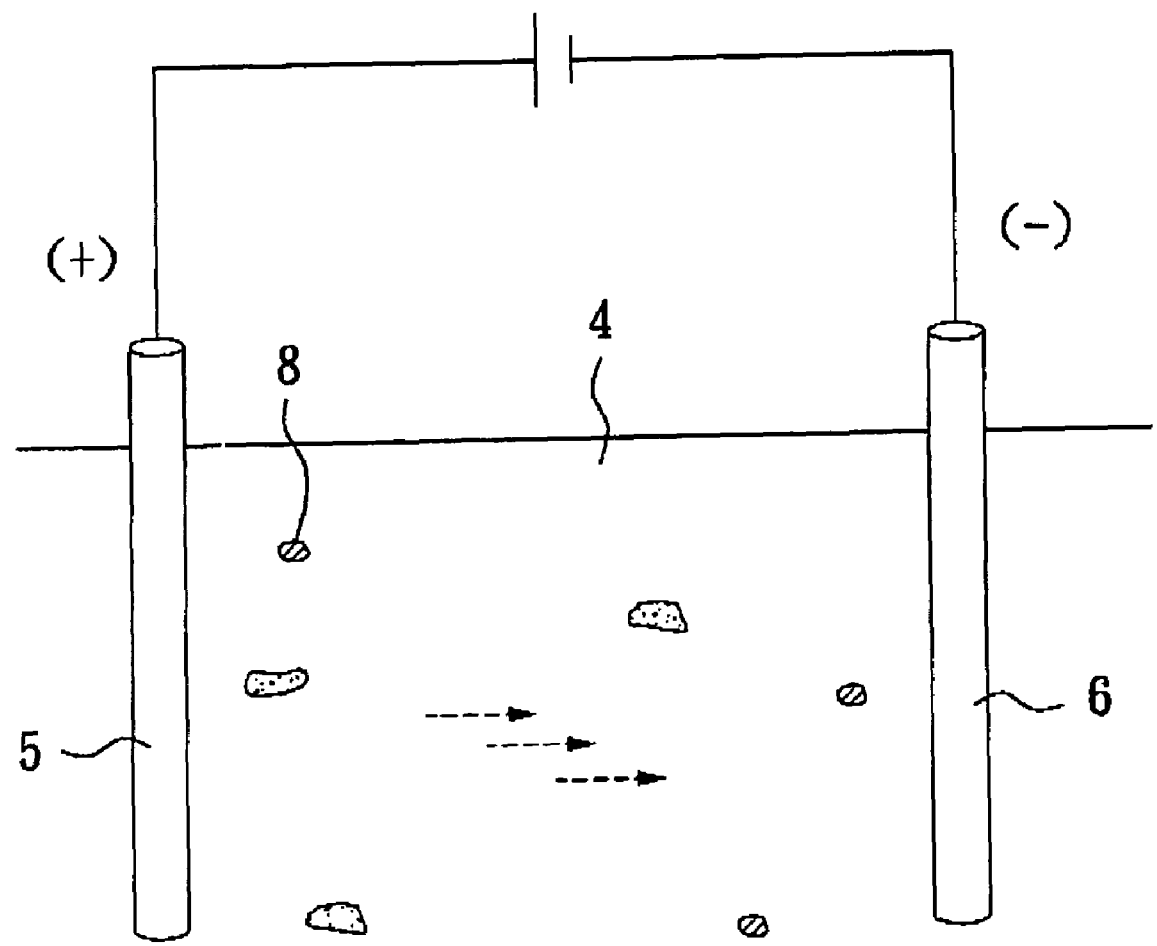
FIG. 3 is a schematic view of an apparatus used in the second preferred embodiment of a method for treating polluted water according to this invention.

FIG. 3 illustrates the second preferred embodiment of a method for treating polluted ground water in the subsurface environment 4. Similar to the first preferred embodiment, the second preferred embodiment also achieves the desired object of this invention.

According to the present invention, with application of an electric field, the nanoparticles are efficiently transported in the polluted porous medium, thereby resulting in an improvement in the treatment efficiency and a decrease in the treatment time.

While the present invention has been described in connection with what is considered the most practical and preferred embodiments, it is understood that this invention is not limited to the disclosed embodiments but is intended to cover various arrangements included within the spirit and scope of the broadest interpretation and equivalent arrangements.

What is claimed is:

1. A method for treating a body of a polluted porous medium, comprising the steps of:

preparing a reactive solution containing nanoparticles;

injecting the reactive solution into the body of the polluted porous medium so as to decompose pollutants in the polluted porous medium by reacting the nanoparticles with the pollutants; and applying an electric field to the body of the polluted porous medium so as to enhance transporting effect of the nanoparticles in the body of the polluted porous medium.

2. The method of claim 1, wherein the reactive solution is prepared by adding a reducing agent into an aqueous solution of an iron salt to reduce iron ions into iron nanoparticles, followed by adding a dispersing agent into the mixture to permit suspension of the iron nanoparticles in the reactive solution.

3. The method of claim 2, wherein the iron salt is a compound selected from the group consisting of: ferric chloride, ferrous chloride, ferric sulfide, ferrous sulfide, ferric nitride, ferrous nitride, ferric bromide, ferrous bromide, and combinations thereof.

4. The method of claim 3, wherein the reducing agent is selected from the group consisting of: sodium borohydride, potassium borohydride, lithium borohydride, sodium carbonate, potassium carbonate, sodium hydroxide, potassium hydroxide, lithium hydroxide, methanol, ethanol, lithium aluminum tetrahydride, ammonium ion, hydrazine, citric acid, sodium citrate, potassium citrate, and combinations thereof.

5. The method of claim 4, wherein the dispersing agent is selected from the group consisting of polyvinylalcohol, polyacrylic acid, polyvinylpyrrolidone, polyethyleneimine, polyethylene oxides, sodium polyphosphate, sodium polyacrylate, terraalkylammonium halogenides, sodium dodecyl sulfate, sodium hexametaphosphate, and combinations thereof.

6. The method of claim 2, wherein the iron nanoparticles have a particle size ranging from 1 to 100 nm.

* * * * *